(12) United States Patent
Justiss et al.

(10) Patent No.: US 7,971,006 B2
(45) Date of Patent: Jun. 28, 2011

(54) SYSTEM AND METHOD FOR HANDLING STATUS COMMANDS DIRECTED TO PARTITIONED MEDIA LIBRARY

(75) Inventors: Steven A. Justiss, Lakeway, TX (US); Linlin Gao, Cedar Park, TX (US)

(73) Assignee: Crossroads Systems, Inc., Austin, TX (US)

( * ) Notice: Subject to any disclaimer, the term of this patent is extended or adjusted under 35 U.S.C. 154(b) by 386 days.

(21) Appl. No.: 11/046,019

(22) Filed: Jan. 28, 2005

(65) Prior Publication Data
US 2006/0174071 A1 Aug. 3, 2006

(51) Int. Cl.
*G06F 12/00* (2006.01)
*G06F 13/00* (2006.01)
*G06F 13/28* (2006.01)

(52) U.S. Cl. ........................................... 711/156
(58) Field of Classification Search .................. 711/156
See application file for complete search history.

(56) References Cited

U.S. PATENT DOCUMENTS

| | | | |
|---|---|---|---|
| 4,104,718 A | 8/1978 | Poublan et al. | |
| 4,430,701 A | 2/1984 | Christian et al. | |
| 4,945,428 A | 7/1990 | Waldo | |
| 5,214,768 A | 5/1993 | Martin et al. | |
| 5,455,926 A | 10/1995 | Keele et al. | |
| 5,506,986 A | 4/1996 | Healy | |
| 5,546,315 A | 8/1996 | Kleinschnitz | |
| 5,546,557 A | 8/1996 | Allen et al. | |
| 5,548,521 A | 8/1996 | Krayer et al. | |
| 5,568,629 A | 10/1996 | Gentry et al. | |
| 5,592,638 A | 1/1997 | Onodera | |
| 5,598,385 A | 1/1997 | Mizukami et al. | |
| 5,612,934 A | 3/1997 | Dang et al. | |
| 5,740,061 A | 4/1998 | Dewey et al. | |
| 5,761,503 A | 6/1998 | Fisher | |
| 5,764,615 A | 6/1998 | Ware et al. | |
| 5,790,852 A | 8/1998 | Salm | |
| 5,870,732 A | 2/1999 | Fisher et al. | |
| 5,892,633 A * | 4/1999 | Ayres et al. | 360/73.08 |
| 5,914,919 A | 6/1999 | Fosler et al. | |

(Continued)

FOREIGN PATENT DOCUMENTS
EP 1156408 A1 11/2001

(Continued)

OTHER PUBLICATIONS

ANSI, SCSI-2 Specification, archived on Jul. 12, 2002, retrieved from http://web.archive.org/web/20020712181903/http://ldkelley.com/SCSI2/SCSI/SCSI2-17.html on Jun. 9, 2009, 30 pages.*

(Continued)

*Primary Examiner* — Gary W. Cygiel
(74) *Attorney, Agent, or Firm* — Sprinkle IP Law Group (57) ABSTRACT

Embodiments of the present invention provide a method and system for handling status commands directed to a partitioned media library. A controller (e.g., storage router or other device) that controls access to the physical media library can receive a status command and determine whether it should respond to the status command without passing the command to the media changer of the physical media library. If the controller should respond, the controller can construct a response and send it to the issuing host application. Otherwise the controller can pass the command to the media changer of the physical media library.

17 Claims, 5 Drawing Sheets

U.S. PATENT DOCUMENTS

| | | | |
|---|---|---|---|
| 5,925,119 | A | 7/1999 | Maroney |
| 5,956,301 | A | 9/1999 | Dimitri et al. |
| 5,959,866 | A | 9/1999 | Hanaoka et al. |
| 5,963,971 | A | 10/1999 | Fosler et al. |
| 5,971,281 | A | 10/1999 | Frary et al. |
| 6,018,760 | A | 1/2000 | Oishi et al. |
| 6,031,798 | A | 2/2000 | James et al. |
| 6,038,490 | A | 3/2000 | Dimitri et al. |
| 6,041,329 | A | 3/2000 | Kishi |
| 6,041,381 | A | 3/2000 | Hoese |
| 6,044,442 | A | 3/2000 | Jesionowski |
| 6,052,341 | A | 4/2000 | Bingham et al. |
| 6,058,494 | A * | 5/2000 | Gold et al. .................. 714/42 |
| 6,085,123 | A | 7/2000 | Baca et al. |
| 6,185,165 | B1 | 2/2001 | Jesionowski et al. |
| 6,327,519 | B1 | 12/2001 | Ostwald et al. |
| 6,327,594 | B1 | 12/2001 | Van Huben et al. |
| 6,328,766 | B1 | 12/2001 | Long |
| 6,336,172 | B1 | 1/2002 | Day, III et al. |
| 6,356,803 | B1 | 3/2002 | Goodman et al. |
| 6,360,232 | B1 | 3/2002 | Brewer et al. |
| 6,374,241 | B1 | 4/2002 | Lamburt et al. |
| 6,385,706 | B1 | 5/2002 | Ofek et al. |
| 6,425,035 | B2 | 7/2002 | Hoese et al. |
| 6,425,059 | B1 | 7/2002 | Basham et al. |
| 6,480,934 | B1 | 11/2002 | Hino et al. |
| 6,487,561 | B1 | 11/2002 | Ofek et al. |
| 6,493,721 | B1 | 12/2002 | Getchius et al. |
| 6,507,883 | B1 | 1/2003 | Bello et al. |
| 6,507,889 | B1 | 1/2003 | Tsurumaki et al. |
| 6,574,641 | B1 * | 6/2003 | Dawson et al. ............... 707/204 |
| 6,604,165 | B1 | 8/2003 | Terao |
| 6,665,786 | B2 | 12/2003 | McMichael et al. |
| 6,675,260 | B2 | 1/2004 | Torrey et al. |
| 6,715,031 | B2 | 3/2004 | Camble et al. |
| 6,725,352 | B2 | 4/2004 | Goodman et al. |
| 6,725,394 | B1 | 4/2004 | Bolt |
| 6,738,885 | B1 | 5/2004 | Zhang et al. |
| 6,763,419 | B2 | 7/2004 | Hoese et al. |
| 6,772,231 | B2 | 8/2004 | Reuter et al. |
| 6,804,753 | B1 | 10/2004 | Moody, II et al. |
| 6,823,401 | B2 | 11/2004 | Feather, Jr. et al. |
| 6,839,824 | B2 * | 1/2005 | Camble et al. ................ 711/173 |
| 6,845,431 | B2 * | 1/2005 | Camble et al. ................ 711/152 |
| 6,950,723 | B2 | 9/2005 | Gallo et al. |
| 7,136,988 | B2 | 11/2006 | Gallo |
| 7,146,244 | B2 | 12/2006 | Byers et al. |
| 7,199,809 | B1 | 4/2007 | Lacy et al. |
| 7,200,546 | B1 * | 4/2007 | Nourmohamadian et al. . 703/24 |
| 7,370,173 | B2 | 5/2008 | Justiss et al. |
| 7,428,613 | B1 | 9/2008 | Justiss et al. |
| 7,451,291 | B2 | 11/2008 | Justiss et al. |
| 7,454,565 | B1 | 11/2008 | Justiss et al. |
| 7,505,980 | B2 | 3/2009 | Tyndall et al. |
| 7,603,449 | B1 | 10/2009 | Dale et al. |
| 7,752,384 | B2 | 7/2010 | Moody, II et al. |
| 7,752,416 | B2 | 7/2010 | Justiss et al. |
| 7,788,413 | B1 | 8/2010 | Justiss et al. |
| 2001/0020197 | A1 | 9/2001 | Nakano et al. |
| 2002/0004883 | A1 | 1/2002 | Nguyen et al. |
| 2002/0019863 | A1 | 2/2002 | Reuter et al. |
| 2002/0144048 | A1 | 10/2002 | Bolt |
| 2002/0169521 | A1 | 11/2002 | Goodman et al. |
| 2002/0188592 | A1 | 12/2002 | Leonhardt et al. |
| 2002/0199077 | A1 | 12/2002 | Goodman et al. |
| 2003/0014585 | A1 | 1/2003 | Ji |
| 2003/0070053 | A1 | 4/2003 | Gallo et al. |
| 2003/0084240 | A1 | 5/2003 | Torrey et al. |
| 2003/0126360 | A1 | 7/2003 | Camble et al. |
| 2003/0126361 | A1 | 7/2003 | Slater et al. |
| 2003/0126362 | A1 | 7/2003 | Camble et al. |
| 2003/0126395 | A1 | 7/2003 | Camble et al. |
| 2003/0126396 | A1 | 7/2003 | Camble et al. |
| 2003/0126460 | A1 | 7/2003 | Camble et al. |
| 2003/0131157 | A1 | 7/2003 | Hoese et al. |
| 2003/0131253 | A1 | 7/2003 | Martin et al. |
| 2003/0135580 | A1 | 7/2003 | Camble et al. |
| 2003/0212873 | A1 | 11/2003 | Lee et al. |
| 2003/0221054 | A1 | 11/2003 | Wu |
| 2004/0044828 | A1 | 3/2004 | Gibble et al. |
| 2004/0044871 | A1 | 3/2004 | Weber et al. |
| 2004/0054838 | A1 | 3/2004 | Hoese et al. |
| 2004/0064641 | A1 | 4/2004 | Kodama |
| 2004/0088513 | A1 | 5/2004 | Biessener et al. |
| 2004/0107300 | A1 | 6/2004 | Padmanabhan et al. |
| 2004/0111580 | A1 | 6/2004 | Weber et al. |
| 2004/0133915 | A1 | 7/2004 | Moody, II et al. |
| 2004/0139094 | A1 | 7/2004 | Tyndall et al. |
| 2004/0139195 | A1 | 7/2004 | Feather, Jr. et al. |
| 2004/0139240 | A1 | 7/2004 | DiCorpo et al. |
| 2004/0139260 | A1 | 7/2004 | Steinmetz et al. |
| 2004/0148460 | A1 | 7/2004 | Steinmetz et al. |
| 2004/0148461 | A1 | 7/2004 | Steinmetz et al. |
| 2006/0069844 | A1 | 3/2006 | Gallo et al. |
| 2006/0149919 | A1 | 7/2006 | Arizpe et al. |
| 2007/0162656 | A1 | 7/2007 | Bryan et al. |
| 2009/0049224 | A1 | 2/2009 | Justiss et al. |

FOREIGN PATENT DOCUMENTS

| | | |
|---|---|---|
| WO | WO02/27463 A2 | 4/2002 |
| WO | WO 03/104971 A1 | 12/2003 |
| WO | WO 2004/044783 A2 | 5/2004 |
| WO | WO 2004/044784 A2 | 5/2004 |

OTHER PUBLICATIONS

International Search Report for PCT/US03/35824, Dec. 6, 2004.

International Search Report for PCT/US 03/35822, Dec. 6, 2004.

Working Draft NCITS T10 Project 999D, "Information Technology—SCSI-3 Medium Changer Commands (SMC)", pp. 1-68, Mar. 4, 1998.

Working Draft INCITS T10 Project 1383D, Information Technology—SCSI Media Changer Commands—2 (SMC-2), pp. i-x and 1-58, Nov. 18, 2003.

U.S. Patent Office Official Action issued Jul. 5, 2007 in U.S. Appl. No. 11/046,066, Justiss et al.

U.S. Patent Office Official Action issued Jun. 28, 2007 in U.S. Appl. No. 11/045,443, Justiss et al.

U.S. Patent Office Official Action issued Aug. 29, 2007 in U.S. Appl. No. 10/880,360, Justiss et al.

Office Action dated Feb. 1, 2008 issued in U.S. Appl. No. 10/704,265.

CNET Glossary: Terms for the techie: controller, [online] pp. 1-2, downloaded from internet www.cnet.com/4520-6029_1-6040342-1.html?tag=txt retrived on Jul. 27, 2007.

CNET Glossary: Terms for the techie: crawler, [online] pp. 1-2, downloaded from internet www.cnet.com/4520-6029_1-6040342-1.html?tag=txt retrived on Jul. 27, 2007.

Griswold, "Storage Topologies", [online] pp. 1-8, downloaded from internet www.crossroads.com/Library/CollateralDownloads.asp on Jul. 27, 2007, Dec. 2002.

SGI—OpenVault Glossary of Terms, [online] pp. 1-8, downloaded from Internet: www.sgi.com/products/software/openvault/glossary/html on Jul. 27, 2007, 1993-2007, source SGI.

Tape Solutions: Router vs. Native Fibre Channel, Crossroads White Paper, pp. 1-7, Doc. Version #001, Crossroads Systems, Inc., Apr. 29, 2002.

Office Action dated Jul. 21, 2008 issued in U.S. Appl. No. 10/704,265.

Office Action issued in U.S. Appl. No. 10/703,965, mailed Mar. 24, 2009, Moody, 8 pages.

Office Action issued in U.S. Appl. No. 11/118,167, dated May 12, 2009.

Office Action issued in U.S. Appl. No. 10/703,965, dated Mar. 24, 2009.

Office Action issued in U.S. Appl. No. 10/704,265 OA dated Jul. 21, 2008.

International Search Report for PCT/US03/35822 dated Dec. 6, 2004.

International Search Report for PCT/US03/35824 dated Dec. 6, 2004.

Office Action issued in U.S. Appl. No. 12/237,969 mailed Oct. 14, 2009, 7 pgs.

Office Action issued in U.S. Appl. No. 10/704,265 mailed May 3, 2007, 16 pgs.
Office Action issued in U.S. Appl. No. 10/704,265 mailed May 19, 2006, 18 pgs.
Office Action issued in U.S. Appl. No. 10/880,162 mailed Aug. 30, 2006, 5 pgs.
Office Action issued in U.S. Appl. No. 10/880,360 mailed Aug. 30, 2006, 5 pgs.
Office Action issued in U.S. Appl. No. 10/704,265 mailed Nov. 14, 2006, 16 pgs.
Office Action issued in U.S. Appl. No. 10/880,162 mailed Feb. 12, 2007, 6 pgs.
Office Action issued in U.S. Appl. No. 10/880,360 mailed Feb. 12, 2007, 6 pgs.
Office Action issued in U.S. Appl. No. 11/045,443, mailed Feb. 26, 2007, 13 pgs.
Office Action issued in U.S. Appl. No. 11/046,066, mailed Feb. 26, 2007, 17 pgs.
Office Action issued in U.S. Appl. No. 11/118,167, mailed Nov. 27, 2009, 32 pgs.
Office Action issued in U.S. Appl. No. 12/795,497, mailed Aug. 31, 2010, 5 pgs.
Office Action issued in U.S. Appl. No. 12/762,066, mailed Nov. 5, 2010, 5 pgs.
Notice of Allowance for U.S. Appl. No. 12/795,497, mailed Dec. 23, 2010, 6 pgs.
Notice of Allowance for U.S. Appl. No. 12/795,497, mailed Mar. 2, 2011, 6 pgs.
Notice of Allowance for U.S. Appl. No. 12/762,066, mailed Mar. 31, 2011, 10 pgs.

* cited by examiner

SYSTEM AND METHOD FOR HANDLING STATUS COMMANDS DIRECTED TO PARTITIONED MEDIA LIBRARY

TECHNICAL FIELD OF THE INVENTION

Embodiments of the invention relate generally to partitioned media libraries and more particularly to systems and methods for handling status commands directed to a partitioned media library.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-medium command to the robot and the robot moves the tape cartridge.

In a SCSI tape library, devices that are part of the library are typically addressed by target number and logical unit numbers ("LUN"). Thus, each drive and media changer of a tape library typically has a target number and LUN. Cartridge slots, on the other hand, are addressed by element addresses that are used by the robot to locate the slots. Because the robot also places tape cartridges in the drives, each drive is also associated with an element address. The robot is also assigned an element address. If multiple tape libraries are connected to a single device (e.g., a Fibre Channel to SCSI routing device), the tape libraries may be further addressed by bus number.

The operation of traditional media libraries leads to problems when multiple hosts attempt to access the media library. For instance, two or more hosts may attempt to access the same cartridge slot at the same time, but for data at different locations on the tape. In this situation, there is a conflict and the tape library system must somehow resolve the issue of which host's access request the system will respond to. The conflict becomes even more apparent when the tape library system has more than one tape drive. The system then has to resolve not only the question of which access request to respond to, but also which tape drive the tape should be loaded into. Therefore, it is desirable to control access to media libraries by multiple hosts in a manner that reduces or prevents conflicts. Moreover, many host applications expect that all types of element addresses in a media library will be contiguous. Indeed, contiguous element addresses are required by the SCSI Media Changer ("SMC") and SMC-2 standards.

Another issue encountered is that many independent software vendor ("ISV") host applications timeout commands such as MODE SENSE commands, INQUIRY commands and LOG SENSE commands and other status commands. If the commands are passed to the media library through an access control device such as a storage routing device, the storage routing device may not be able to forward a command to the media library, receive a response and return the response to the command before the command is timed out by the host application. The issue of timing out commands can become more problematic as the number hosts issuing commands to the media library increases. Therefore, it is desirable to have a mechanism to quickly process status commands for a media library that is shared among host applications.

SUMMARY OF THE INVENTION

Embodiments of the present invention provide a system and method of handling status commands that allows status information to be quickly returned to host applications. According to one embodiment of the present invention, a controller (storage router, router, or other device) controls access to a physical media library. When the controller receives status commands, the controller can determine whether it should respond to the command without passing the command to the physical media library. If the controller should respond to the command, the controller can process the command and send a response to the host application that issued the command. For example, for a MODE SENSE command requesting an element address assignment ("EAA") page, the controller can respond to the command by providing an EAA page that contains logical element addresses for a library partition assigned to the issuing host application. For other commands (e.g., a LOG SENSE command), the controller can determine if the media changer of the physical media library is busy and, if the media changer is busy, can respond to the command using, for example, cached status information. If the media changer is not busy, the controller can pass the status command to the media changer of the physical media library. When a response is received from the media changer, the controller can pass the response to the issuing host application and cache the status information. This can allow the controller to respond to similar future status commands if the media changer is busy.

One embodiment of the present invention includes a method for handling status commands directed to a partitioned media library. The method comprises receiving a status command at a controller from an issuing host application and determining whether the controller should respond to status command without passing the status command to the media changer. Generally, the command is initially formed based on a library partition presented to the host application. If the controller should respond to the status command without passing the status command to the media changer, the method further includes processing the status command at the controller, and returning a response to the status command to the issuing host application. According to one embodiment, if it is determined that the controller should pass the command to the media changer, the method can further include forwarding the status command to the media changer, receiving status information from the media changer in response to the status command, caching the status information at the controller and returning the status information to the issuing host application.

Another embodiment of the present invention includes a computer program product that comprises a set of computer instructions stored on a computer readable medium. The computer instructions comprise instructions executable to determine whether to respond to a status command directed to a media changer from an issuing host application without passing the status command to the media changer. The set of computer instructions further comprise instructions executable to process the status command and return a response to the status command to the issuing host application if the status command should be responded to without passing the status command to the media changer. The set of computer instructions can further include instructions executable to forward the status command to the media changer, cache status information received from the media changer and return the status information to the issuing host application if it is determined that the command should be passed to the media changer.

Yet another embodiment of the present invention comprises a method for handling status commands directed to a partitioned media library that comprises receiving a MODE SENSE command requesting an element address assignment ("EAA") page at a controller that controls access to a physical media library and is remote from the physical media library, and returning the EAA page with logical element addresses corresponding to a library partition assigned to the issuing host application without forwarding the MODE SENSE command to a media changer of the physical media library.

Yet another embodiment of the present invention comprises a method for handling status commands directed to a partitioned media library that comprises receiving a status command from the issuing host application at a controller that controls access to a physical media library, determining if a media changer is busy and returning a set of cached status information if the media changer is busy. Otherwise, the method comprises forwarding the status command to the media changer, receiving a set of status information from the media changer in response to the status command, caching the set of status information and returning the set of status information to the issuing host application.

Embodiments of the present invention provide an advantage by allowing status information for partitioned media libraries to be returned to host applications in a manner that reduces or prevents time outs and increases command response performance.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

To resolve the problem of controlling access to a media library by multiple hosts, the media library can be partitioned. In partitioned media libraries, a larger media library is presented to hosts as one or more logical media libraries, with each logical media library representing some portion or all of the physical media library. Embodiments of partitioning a media library are described in U.S. Pat. No. 6,804,753, entitled "Partitioned Library", issued Oct. 12, 2004, by Moody et al. and assigned to Crossroads Systems, Inc. of Austin, Tex, and U.S. patent application Ser. No. 10/704,265, entitled "System and Method for Controlling Access to Multiple Physical Media Libraries", filed Nov. 7, 2003, by Tyndall et al., now U.S. Pat. No. 7,505,980 and assigned to Crossroads Systems, Inc. of Austin, Tex., each of which is fully incorporated by reference herein. In various implementations access control to a partitioned media library can be provided by a single device (e.g., a router or other device) or can be provided by multiple devices (e.g., multiple routers or other devices) in a distributed or centralized manner. One embodiment of centralized access control is described in U.S. patent application Ser. No. 10/880,360, entitled "System and Method for Centralized Partitioned Library Mapping", filed Jun. 29, 2004, by Justiss et al., now U.S. Pat. No. 7,428,613, and assigned to Crossroads Systems, Inc. which is hereby fully incorporated by reference herein. U.S. patent application Ser. No. 10/880,162, entitled "System and Method for Distributed Partitioned Library Mapping", filed Jun. 29, 2004 by Justiss et al., now U.S. Pat. No. 7,454,565, and assigned to Crossroads Systems, Inc., which is hereby fully incorporated by reference herein, describes an embodiment of providing distributed access control to a media library.

In partitioning a media library, the various elements (e.g., storage elements, medium transport elements, import/export elements, data transfer elements) can be assigned logical element addresses by the device that provides access control to the media library. While this can be done in an arbitrary manner, the SCSI-2 and SCSI-3 Medium Changer Commands ("SMC") specifications (e.g., SMC and SMC-2 specifications), require that element addresses of a given element type be contiguous. Therefore, host applications that wish to access a media library expect to see storage elements listed in contiguous order, data transfer elements listed in contiguous order and so on. U.S. patent application Ser. No. 11/045,443, entitled "Method and System for Presenting Contiguous Element Addresses for a Partitioned Media Library", filed Jan. 28, 2005, to Justiss et al. (the "Contiguous Element Address Application"), now U.S. Pat. No. 7,370,173, which is hereby fully incorporated by reference herein, describes one mechanism for mapping potentially disjoint physical element addresses to logical element addresses.

Host applications can issue a variety of status commands to a media library, including but not limited to MODE SENSE and LOG SENSE. The present invention provides a method and system for handling of status commands by a controller that provides access to a media library. According to one embodiment, the controller can receive a status command from an issuing host application and determine whether it should respond to the command without passing the command to the media changer of the media library. If so, the controller can process the command and return a response that includes status information to the issuing host application. The decision as to whether the controller should respond to the command can be based on the command itself, the status of the physical media changer at the media library or other factor(s). For example, because the controller maintains the logic to present library partitions (i.e., the logic to present logical addresses to the host application), the controller can process MODE SENSE commands requesting an element address assignment ("EAA") page. For other commands, such as LOG SENSE, the controller can base its decision on whether to respond to the status command based on whether the media changer is busy. If the media changer is busy, the controller can respond to the command without forwarding it to the media changer. This can include returning cached LOG SENSE status information that was received from the media changer in response to a previous LOG SENSE command (for the same bit value). Otherwise the controller can pass the status command to the media changer of the physical media library.

Figure 1:
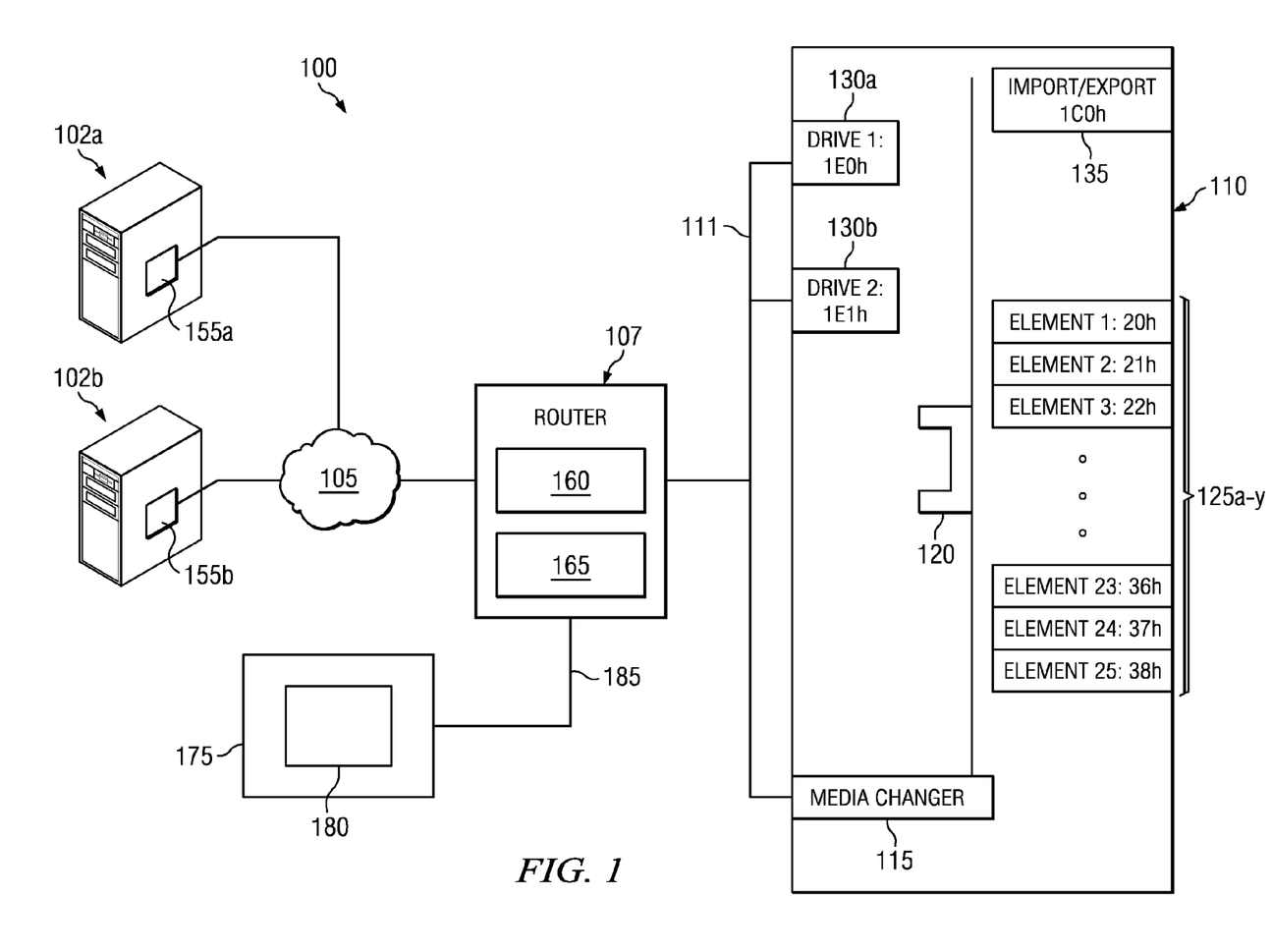
FIG. 1 is a diagrammatic representation of one embodiment of a system in which embodiments of the present invention can be implemented.

FIG. 1 illustrates one embodiment of a system 100 for partitioning a media library in which embodiments of the present invention can be implemented. System 100 includes multiple hosts 102a-102b connected via a first data transport medium 105 (e.g., a storage area network, a LAN, a WAN or other network known in the art) to a controller 107 that controls access to media library 110. Controller 107 can be connected to media library 110 by a second data transport medium 111 that can be the same as or different from first data transport medium 105. Media library 110 is typically a variation of a SCSI media changer, which generally contains at least one media changer 115 with an associated medium transport element 120 (alternatively referred to as a "robot" or "picker"), multiple storage elements 125a-y ("element 1" through "element 25") that can store storage volumes (e.g., tape cartridges, optical disks), and multiple data transfer elements ("drive 1" and "drive 2") 130a and 130b. Media library 110 can also have import/export element 135. The media changer 115 is often a microprocessor based embedded controller that controls medium transport element 120. Medium transport element 120 physically moves storage volumes from one element to another based on element addresses provided to media changer 115. For example, medium transport element 120 can move a storage volume from a storage element to a data transfer element in response to a "MOVE MEDIUM" command.

In a partitioned library, a large, multi-storage element, multi-data transfer element library is represented to applications (independent software vendor ("ISV") applications or other host applications) running on hosts (e.g., applications 155a-155b) as a number of different potentially smaller libraries, each with some allocated number of storage elements, some allocated number of data transfer elements, and some number of allocated import/export elements. Each host may see a different media library that represents some subset (or all) of media library 110. Thus, for example, application 155a running on host 102a may see a different media library than application 155b running on host 102b.

Each element (e.g., storage element, medium transport element, data transfer element, import/export element) of media library 110 has a physical element address used by medium transport element 120 to locate and move tape cartridges (or other media). To comply with SCSI-2 and SCSI-3 standards, element addresses of a particular element type must be contiguous. Data transfer elements can also have a network or bus address (e.g., a LUN, an IP address or other address) and/or target number that is used to forward commands to those elements on a data transport medium (e.g., a bus or network). Similarly, media changer 115 can also have a LUN or other data transport medium address that is used in locating media changer 115 on a data transport medium. The target numbers and data transport medium addresses (e.g., LUNs or other data transport medium address), however, do not have to be contiguous.

As an example of contiguous element addresses within an element type, medium transport element 120 can have an element address of 00h, data storage elements 125a-y can have addresses of 20h-38h, import/export element 135 can have an address of 1C0h and data transfer elements 130a and 130b can have addresses of 1E0h-1E1h. Thus, for each element type, the elements of that type have contiguous physical element addresses. However, the blocks of addresses assigned to an element type do not have to be contiguous with the addresses assigned to other element types.

Information for a media library regarding element addresses is typically discovered through a MODE SENSE page. Table 1 illustrates an example set of MODE SENSE data, as specified in the SCSI-2 and SCSI-3 standards, for physical media library 110 of the previous example (a diagrammatic representation of one embodiment of a MODE SENSE 0x1Dh page (i.e., an EAA page) is provided in FIG. 2):

TABLE 1

| Element Type | Starting Address | Number of Elements |
| --- | --- | --- |
| Medium Transport Element | 00h | 1 |
| Data Storage Element | 20h | 25 |
| Import/Export Element | 1C0h | 1 |
| Data Transfer Element | 1E0h | 2 |

The physical media library can be partitioned into logical library partitions, which can be configured by an administrator from an administrator computer 175 that runs a configuration program 180 such as StorageWorks Command View by Hewlett-Packard Company of Palo Alto, Calif. The configuration information for the partitions can be passed to controller 107 via an administrative data transport medium 185, such as an Ethernet network, serial connection or other data transport medium. Generally, in partitioning the physical media library, an administrator will assign to each partition some number of data storage elements, data transfer elements, medium transport elements and import/export elements. It should be noted that there may be additional devices involved in configuration. For example, the administrator computer 175 may transmit configuration information to another device (e.g., an embedded Hewlett Packard configuration controller) that, in turn, provides the configuration information to controller 107. In this configuration, the Command View application communicates with the configuration controller and the configuration controller provides the configuration information to controller 107. The Command View application is generally used to only assign the physical elements to each partition.

Table 2 and Table 3 provide an example of two partitions that an administrator can configure:

TABLE 2

Partition 1

Data Transfer Element: Drive #1
Import Export Element 1
Storage Elements: 1-2, 5-6, 9-10, 13-14, 17-18, 21-22 and 25

TABLE 3

Partition 2

Data Transfer Element: Drive #2
Import Export Element 0 (none)
Storage Elements: 3-4, 7-8, 11-12, 15-16, 19-20, 23-24

Access to the physical media library in system 100 is provided by an access controller (e.g., controller 107). Controller 107 can maintain data and logic to perform logical-to-physical mappings for the media library partitions and present the host applications with the appropriate media library partitions. For example, controller 107 can associate Partition 1 (represented at 160) with host 102a and Partition 2 (represented at 165) with host 102b. Consequently, application 155a will see a media library with the elements of Partition 1 and application 155b will see a media library with the elements of Partition 2.

The physical element addresses, according to one embodiment of the present invention, can be mapped to logical element addresses such that the logical element addresses for each element of a particular element type are contiguous. One mechanism for providing such a mapping is provided in the Contiguous Element Address Application. Other embodiments of the present invention can provide physical-to-logical address mappings according to other schemes. Additionally, LUNs, target numbers and other data transport medium addresses (e.g., bus or network addresses) can be mapped to logical addresses. For example, if media changer element 115 is at physical LUN 0, physical LUN 0 can be mapped to LUN 1 for Partition 1 and/or Partition 2. Similarly, the physical LUNs or other data transport medium addresses for drives can be mapped to logical addresses.

Host applications can typically issue a number of commands to a media changer (e.g., media changer 115) to determine status information for the media library. These can include for example, MODE SENSE, INQUIRY, READ ELEMENT STATUS, LOG SENSE and other status commands known or developed in the art. According to one embodiment of the present invention, controller 107 can respond to these commands and return status information to the issuing host application without passing the command to the media changer 115. By servicing the command at controller 107, delays can be reduced or eliminated, thereby preventing or reducing time outs.

When controller 107 receives a status command directed to media changer 115, controller 107 can determine whether it should respond to the command or pass the command to media changer 115. In the example of a MODE SENSE command requesting an EAA page, controller 107 can return the EAA page to the requesting host application. Thus, if host application 155a sends a MODE SENSE command requesting an EAA page, controller 107 can return the EAA page for Partition 1 containing the MODE SENSE information illustrated in Table 4:

TABLE 4

| Element Type | Starting Address | Number of Elements |
|---|---|---|
| Medium Transport Element | 00h | 1 |
| Data Storage Element | 20h | 13 |
| Import/Export Element | 1C0h | 1 |
| Data Transfer Element | 1E0h | 1 |

In the example of Table 4, the medium transport element of Partition 1 has a base logical element address of 00h, the thirteen data storage elements have a base logical element address of 20h, the import/export element has an assigned a base logical element address of 1C0h and the data transfer elements have a base logical element address of 1E0h. Consequently, host application 155a will see a medium transport element at 00h, thirteen data storage elements at 20h-2Ch, an import/export element at 1C0h and a data transfer element at 1E0h.

If, on the other hand, application 155b issues a MODE SENSE command for the EAA page, controller 107 can return the EAA page for Partition 2 containing the MODE SENSE information illustrated in table 5:

TABLE 5

| Element Type | Starting Address | Number of Elements |
|---|---|---|
| Medium Transport Element | 00h | 1 |
| Data Storage Element | 20h | 12 |
| Import/Export Element | 1C0h | 0 |
| Data Transfer Element | 1E0h | 1 |

In this case, host application 155a will see a medium transport element at 00h, thirteen data storage elements at 20h-2Bh, and a data transfer element at 1E0h. While the import/export element is assigned a base logical address of 1C0h, there are no import/export elements assigned to Partition 2 in this example. It should be noted that the examples of Tables 4 and 5 are provided by way of example and any logical element addresses can be assigned to the elements of a media library for a particular partition.

In the example of a MODE SENSE command requesting an EAA page above, controller 107 can return the EAA page for a library partition that includes logical element addresses that map to physical element addresses. The logical element addresses in this case are not known to media changer 115 and therefore there is no reason for controller 107 to pass the MODE SENSE command to media changer 115. Embodiments of the present invention can handle other MODE SENSE pages in a similar manner, including, but not limited to Protocol Specific LUN page (18h), Protocol Specific Port Page (19h). Additionally, other status commands for which the status data does not change often (i.e., the information is relatively static) can be handled automatically by controller 107.

In other cases, however, a command may request status information from media changer 115 that may change fairly often (i.e., the information is relatively dynamic). For example, the LOG SENSE command requests diagnostic information for the media changer 115 that changes based on the state of media changer 115. In the case of LOG SENSE, controller 107 can determine whether to forward the command to media changer 115 based, for example, on whether media changer 115 is busy processing a previous command. If media changer 115 is busy, controller 107 can return LOG SENSE information that is cached at controller 107 based on a previous LOG SENSE command (i.e., for which the returned sense data will have the same bit value). If, on the other hand, media changer 115 is not busy, controller 107 can forward the LOG SENSE command to media changer 107. When controller 107 receives status information in response to the LOG SENSE command, it can cache the status information and forward the status information to the appropriate host application. For the next LOG SENSE command received by controller 107 of the same bit value that controller 107 does not forward to media changer 115 (e.g., because media changer 115 is busy), controller 107 can return the cached LOG SENSE status information in response to the command.

As described above, controller 107 can update the cached LOG SENSE information each time it receives new status information from media changer 115 based on a LOG SENSE command of the same bit value. According to other embodiments, controller 107 can periodically send out a LOG SENSE command to media changer 115 when media changer 115 is not busy. This can allow the cached LOG SENSE data to be updated even if no LOG SENSE command is issued by a host application at a given time.

As with the LOG SENSE command, other status commands may request information known to media changer 115 that changes relatively often. By returning cached status data for these commands when media changer 115 is busy, controller 107 can prevent the command from timing out while still returning the best available status information for the command. Some MODE SENSE commands requesting particular pages can be handled in this manner. For example, MODE SENSE commands for pages including the Control Mode page (0Ah), Disconnect-Reconnect page (02h), Informational Exceptions Page (1Ch), Power Condition Page (1Ah), Device Capabilities Page (1Fh) and Transport Geometry Parameters page (1Eh) can be handled in a manner similar to the LOG SENSE command. Controller 107 can also handle other status commands known or developed in the art in a similar manner.

Controller 107 can be implemented at any point in the command path between host applications and physical media library 110. According to one embodiment of the present invention, controller 107 can be implemented as a storage router with software and/or hardware programming. For purposes of this application a storage router is any device that routes or manages data to and from storage devices, hosts and/or both, including, but not limited to storage area network ("SAN") storage appliances, network attached storage ("NAS") storage appliances, RAID controllers, host bus adapters ("HBA") and other devices that can route/process storage related commands. Each storage router can be, for example, a Fibre Channel to SCSI routing device; Fibre Channel to Fibre Channel routing device; SCSI to SCSI routing device; iSCSI to iSCSI routing device; Fibre Channel to iSCSI routing device; iSCSI to Fibre Channel routing device; iSCSI to SCSI routing device; SCSI to iSCSI routing device; Fibre Channel to Infiniband routing device; Infiniband to Fibre Channel routing device; iSCSI to ATA routing device; ATA to iSCSI routing device; iSCSI to SATA routing device; Serial ATA to iSCSI routing device; Fibre Channel to Serial Attached SCSI routing device; Serial Attached SCSI to Fibre Channel routing device; iSCSI to Serial Attached SCSI routing device; Serial Attached SCSI to iSCSI routing device; Fibre Channel to ATA routing device; ATA to Fibre Channel routing device; Fibre Channel to SATA routing device; SATA to Fibre Channel routing device; Fibre Channel to Serial SCSI Architecture routing device; Serial SCSI Architecture to Fibre Channel routing device; Infiniband to Serial Attached SCSI routing device; Serial Attached SCSI to Infiniband routing device. An example of a storage router includes the Crossroads 10000 storage router, manufactured by Crossroads Systems, Inc. of Austin, Tex.

Figure 2:
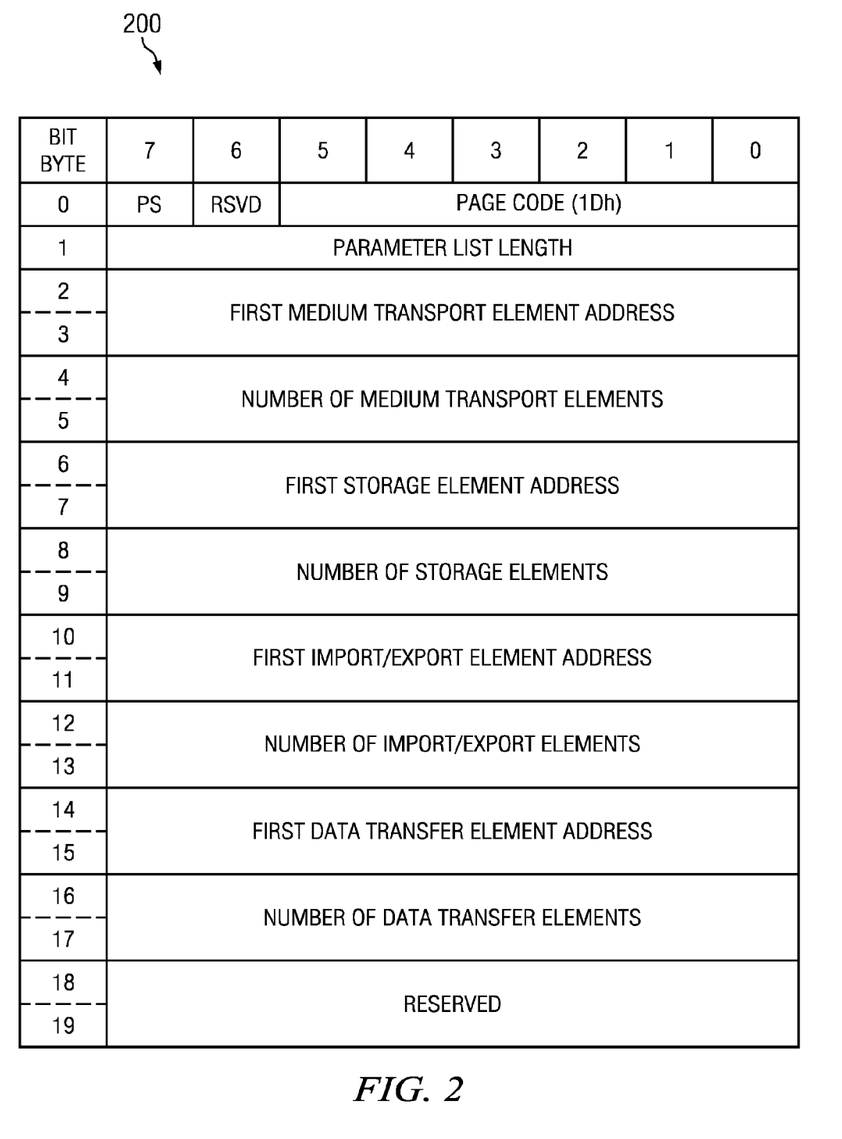
FIG. 2 is a diagrammatic representation of a MODE SENSE element address assignment ("EAA") page according to one embodiment of the present invention.

FIG. 2 is a diagrammatic representation of one embodiment of an EAA mode sense page. As described above, host applications can use a MODE SENSE command to discover information about available storage devices, such as media libraries. The MODE SENSE command is typically used by an application to determine the properties of a media library, particularly the available elements and starting addresses. This information is returned in various mode sense pages, such as the 0x1D mode sense page 200 (i.e., the EAA page). For each element type, the mode sense page includes the starting address for the element type and the number of elements of that type. Using the example of FIG. 1, the MODE SENSE page for Partition 1 will include the information of Table 4, while the MODE SENSE page for Partition 2 will include the information of Table 5.

Figure 3:
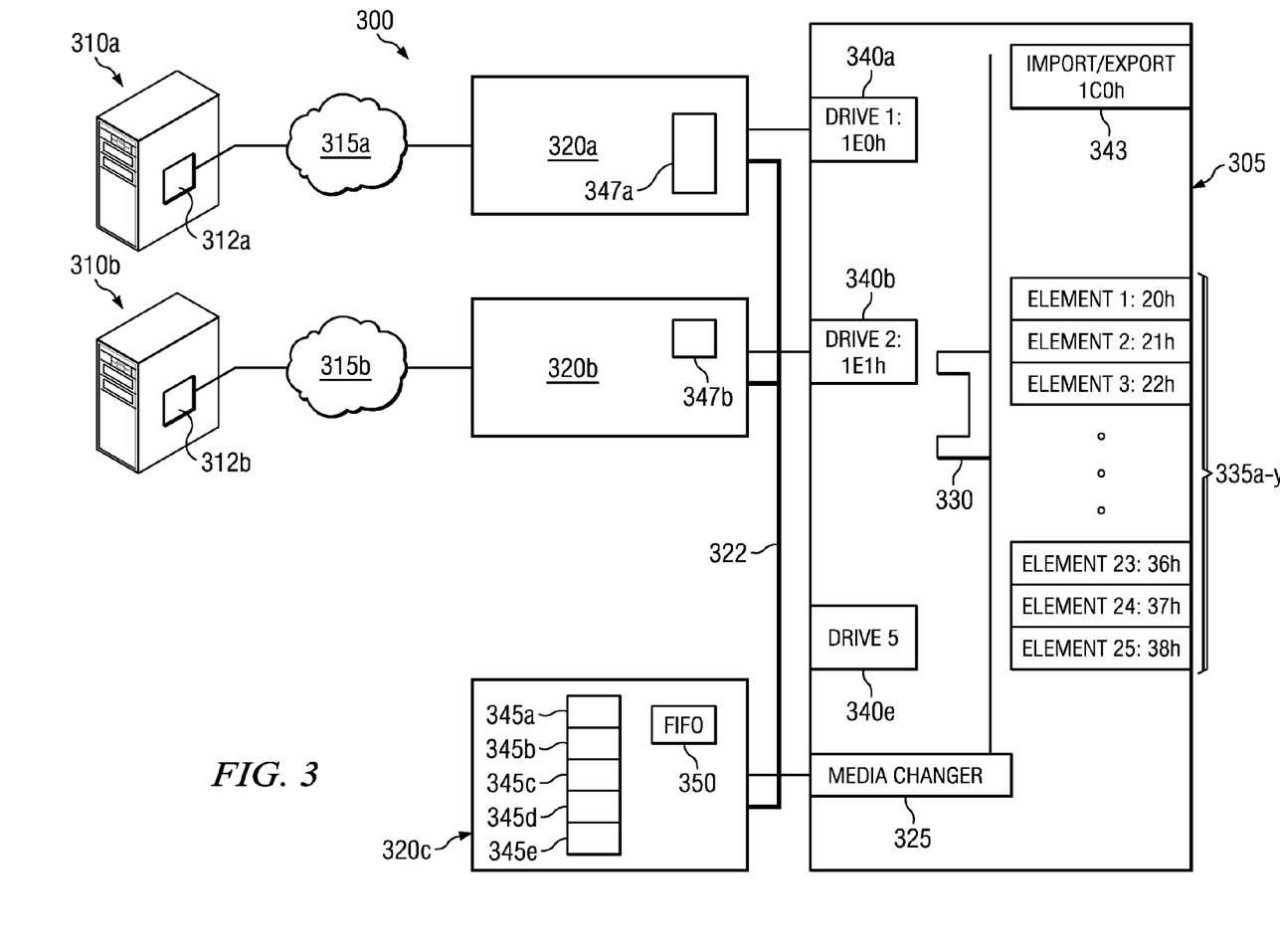
FIG. 3 is a diagrammatic representation of another embodiment of a system to provide centralized or distributed mapping between logical and physical element addresses in which embodiments of the present invention can be implemented.

In the example of FIG. 1, a physical media library is accessed through a single controller. According to other embodiments of the present invention, a physical media library can be accessed through multiple controllers. FIG. 3 is a diagrammatic representation of a system 300 in which a number of hosts have access to a media library 305 through various data transport media according to one embodiment of the present invention. In this embodiment, host 310a is connected to media library 305 via network 315a and controller 320a and host 310b is connected to media library 305 via network 315b and controller 320b. Each host can run one or more host applications (represented by host application 312a-b) configured to access a media library. Additionally, multiple hosts can be connected to media library 305 via the same network 315 and controller 320. Networks 315a-b, according to one embodiment of the present invention, can be a storage area networks ("SAN"), operating according to any data communication protocol known in the art, including SCSI, iSCSI, Fibre Channel, serial attached SCSI ("SAS"), advanced technology attachment ("ATA"), serial ATA ("SATA") or other protocol known in the art. In other embodiments of the present invention, each network 315 can be the Internet, a LAN, a WAN, a wireless network or any other communications network known in the art. Media library 305 can communicate with each controller 320 according protocols including, but not limited to, SCSI, iSCSI, Fibre Channel, SAS, ATA, SATA or other protocol known in the art. Controllers 320 can also communicate with each other via a control network 322 that can operate according any protocol known in the art.

Each controller 320 can include, for example, one or more communications interfaces to connect to media library 305 and to one or more other data transport media, such as a network (e.g., a SAN and/or a control network), processors and computer readable memories (RAM, ROM, magnetic disk, optical disk and/or other computer readable memory known in the art) that can store software instructions. The software instructions can be executable to control access by hosts on the respective data transport medium (e.g., network 315) to media library 305. Each controller, according to one embodiment of the present invention, can comprise a storage router.

Media library 305 can include media changer 325 with an associated medium transport element 330 (alternatively referred to as a "robot" or "picker"), multiple storage elements 335 (in this case, storage elements 335a-y) that can store storage volumes (e.g., tape cartridges, optical disks), data transfer elements (drives) 340a-b and one or more load (import/export) elements 343. The media changer 325 can control medium transport element 330. Medium transport element 330 physically moves storage volumes from one element to another.

For the sake of simplicity, it is assumed that media library 305 uses the same physical element addresses as media library 110 of FIG. 1. Media library 305 can be represented to host applications 312a and 312b as one or more partitions. When a host application searches a network for available media libraries, the controller controlling access to the media library for that host can make a media library partition available to the host application that represents a portion or all of a larger media library.

According to one embodiment, multiple media library partitions can be maintained by controller 320c for hosts. For example, controller 320c can maintain media library partition 345a for host 310a and media library partition 345b for host 310b. Each media library partition represents a host application's view of media library 305. For the sake of simplicity, it is assumed that partition 345a uses the same logical element addresses as Partition 1 from FIG. 1 and partition 345b uses the same logical element addresses as Partition 2 from FIG. 1. The media library partitions can be maintained as mapping logic and one or more tables or according to any storage scheme known in the art.

Each controller 320a-b can include software programming (represented by 347a-b) to present the media library partitions to the associated host application. Each controller 320a-b can maintain all the information for the appropriate media library partitions or only the information necessary to present the media library partition to a host and map commands to the appropriate data transfer element. For example, controller 320a may only include enough information to present media library partition 345a to host application 312a and forward commands to drive 340a and responses to host application 312a.

Each partition can include logical element addresses for the medium transport element, data transfer elements, storage elements and import/export elements assigned to that partition. Additionally, each partition can include logical network addresses or other data transport medium address for the data transfer elements and media changer. For example, if data transfer element 340a is at physical LUN 2, media library partition 345a can map this to logical LUN 3. Similarly, if media changer 325 is at physical LUN 0, it can be mapped, for example to logical LUN 1.

When host application 312a performs discovery on network 315a to find available media libraries, controller 320a can present media library partition 345a showing a data transfer element to logical LUN 3 and a media changer at logical LUN 1. Additionally, media library partition can have logical element addresses for storage elements, data transfer element 340a, medium transport element 330 and import/export element 343. If media library 305 is a tape library, host application 312a will consequently see an available tape library with one drive at LUN 3, having an element address of 1E0h, a media changer at LUN 1, thirteen cartridge slots with element addresses of 20h-2Ch, and an import/export element with an element address of 1C0h.

For commands directed to a data transfer element, a controller can forward the command to the appropriate data transfer element. For example, if media library partition 345a is presented to host application 312a, controller 320a can maintain at least the mapping between LUN 2 and LUN 3 such that if controller 320a receives a command directed to LUN 3, it can map the command to LUN 2 and forward the command to drive 340a. Additionally, controller 320a can perform any additional processing of the command depending on implementation.

For commands directed to media changer 325 (e.g., directed to logical LUN 1), on the other hand, the controller receiving the command (e.g., controller 320a) can forward the command to the controller connected to media changer 325 (e.g., controller 320c). If, for example, host application 312a wishes to move a tape cartridge from storage element 335d (i.e., the storage element at physical address 24h) to data transfer element 340a (i.e., the data transfer element at physical address 1E0h), it will issue a MOVE MEDIUM command to LUN 1, referencing logical storage element address 22h and logical data transfer element address 1E0h. Because the command is directed to LUN 1, controller 320a can forward the command to controller 320c.

Controller 320c, in turn, can map the logical data transport medium address to which the command is directed and the logical element addresses referenced by the command to the physical counterparts of media library 305. Thus, for example, controller 320c can map the command received from controller 320c to LUN 0, map logical element address 22h to physical element address 24h, and map logical element address 1E0h to physical element address 1E0h. Controller 320c therefore modifies the MOVE MEDIUM command to reference physical element addresses 24h and 1E0h and forwards the command to the media changer at LUN 0. Consequently, the command issued by host application 312a to LUN 1 to move a storage volume from the storage element address 22h to the data transfer element at element address 1E0h will be mapped to media changer 325 at LUN 0 to move the storage volume from the physical storage element address 24h to the data transfer element at physical element address 1E0h.

In one embodiment, status commands issued to media changer 325 are also passed to controller 320c. For status commands that request relatively static status information or information known to controller 320c, but not media changer 325, controller 320c can return the status information. Thus, for example, if host application 312a requests a MODE SENSE EAA page, controller 320c can return the EAA page for Partition 1. For status commands issued to a media changer that request relatively dynamic status information, such as a LOG SENSE command, controller 320c can determine whether to forward the status command to media changer 325 or to respond to the status command with cached status information. Thus, in a centralized media library partitioning scheme, controller 320c can act similar to controller 107 of FIG. 1 with the status commands and information potentially being routed through another controller (e.g., controller 320a or controller 320b) to the appropriate host application.

According to another embodiment, each controller 320a-320b can perform the logical to physical mapping of element addresses for hosts. The commands using the physical element addresses can then be forwarded to controller 320c for forwarding to media changer 325. In this case, each of controller 320a-320b can maintain sufficient logic to perform mappings between physical and logical element addresses for all hosts or the hosts that access media library 305 through that particular controller. In this case, processing related to physical-to-logical mappings is distributed among controllers 320a and 320b (e.g., controller 320a performs mapping for commands from host application 312a and controller 320b performs mapping for commands from host application 312b).

For status commands directed to media changer 325, the controller initially receiving the status command can determine whether to forward the command to controller 320c. For a MODE SENSE command from host application 312a requesting a MODE SENSE EAA page, for example, controller 320a can return the EAA page for Partition 1 because controller 320a maintains sufficient information to construct the EAA page. Because controller 320a does not, however, typically know the immediate status of media changer 325, controller 320a can send commands such as LOG SENSE commands to controller 320c. Controller 320c can then determine if media changer 325 is busy and whether to return cached LOG SENSE data.

Configuration of library partitions can be performed by, for example, a library administrator. The library administrator can configure one of the controllers 320, such as controller 320c, with the library partitions. Configuration can be performed via a graphical, control line or other interface using a library control application. In yet another embodiment of the present invention, configuration can be performed using a library control application (e.g., StorageWorks Command View) residing on an administrative computer. The administrative computer can be connected to controllers 320a-c via control network 322. The library partitions can be uploaded from the administrative computer to controller 320c and/or controllers 320a-b. If information is uploaded to only controller 320c, controller 320c can be responsible for sending any information necessary to controllers 320a-b to perform centralized or distributed mapping. Some configuration information can also be provided by the host applications as described, for example, U.S. patent application Ser. No. 11/046,066, entitled "System and Method for Mode Select Handling for a Partitioned Media Library" by Justiss et al., filed Jan. 28, 2005, now U.S. Pat. No. 7,451,291, which is hereby fully incorporated by reference herein.

It should be noted that in many media libraries there is only one or a limited number of robots. Therefore, a media changer (e.g., media changer 325) can not handle concurrent commands or may only handle a few concurrent commands. Controller 320c, on the other hand, may receive many commands directed to media changer 325 from controllers 320a-b. Controller 320c can, therefore, prioritize commands to media changer 325. According to one embodiment of the present invention, controller 320e can maintain a FIFO buffer 350 for commands directed to media changer 325. In other embodiments of the present invention, other prioritization schemes can be employed, such as giving priority to commands from a particular other controller 320. Thus, controller 320c acts to serialize commands directed to media changer 325. The decision as to whether to respond to a status command with cached status information or to pass the command to the media changer can be based, for example, on the number and types of commands in FIFO 350. It should be noted that controller 320c can also interface with one or more data transfer elements and receive commands directly from hosts.

Figure 4:
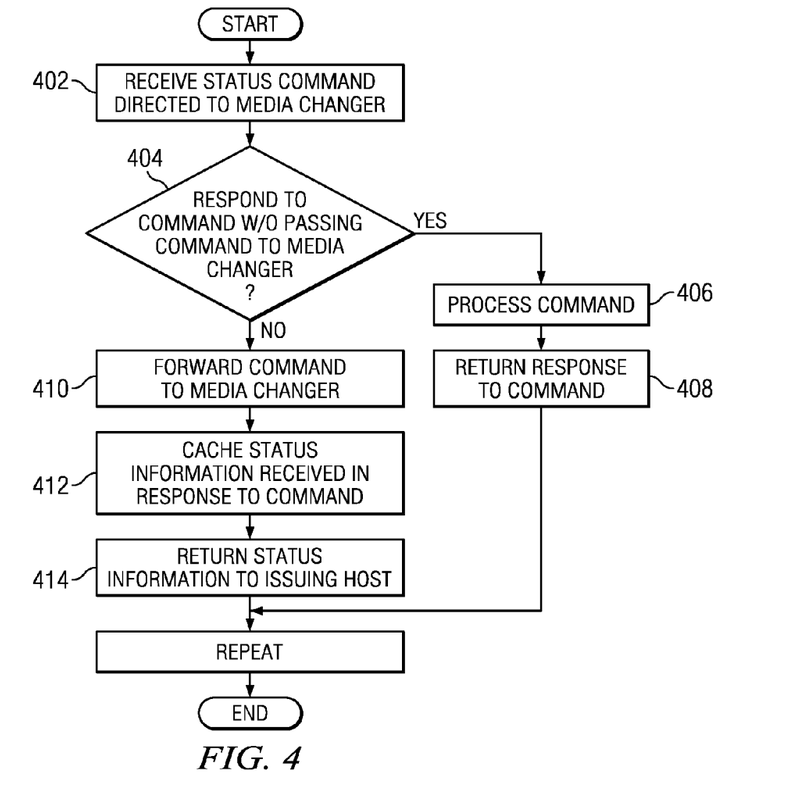
FIG. 4 is a flow chart illustrating one embodiment of a method for handling status commands.

FIG. 4 is a flow diagram illustrating one embodiment of a method for handling status commands. At step 402, a controller (e.g., controller 107) can receive a status command (e.g., a MODE SENSE, a LOG SENSE or other status command known or developed in the art) from an issuing host application that is directed to a media changer of a media library. The status command can be formed by the issuing host application based on a library partition associated with that host application. In other words, the status command may reference logical element addresses and other logical addresses (LUNs, target numbers, etc.) based on the library partition presented to that host application. Using the example of FIG. 1, controller 107 can receive a status command from host application 155a direct to media controller 125 based on library partition 160 (Partition 1).

The controller, at step 404, can determine whether it should respond to the command with status information or pass the command to the media changer of the media library. This can be based on the command itself (e.g., the controller can respond to a MODE SENSE commands requesting an EAA page), the status of the media changer to which the command is directed (e.g., is the media changer busy) or other factor(s).

If the controller is to respond to the command, the controller can process the command (step 406) and return a response (step 408) to the issuing host application. Processing the command can include, for example, constructing the appropriate EAA page, loading cached status information or other processing. Additionally, if needed, the controller can map physical addresses in the status information to the corresponding logical addresses for the library partition associated with the issuing host application.

If, on the other hand, it is determined that the command should be passed to the media changer of the media library, the controller can forward the command to the physical media changer (step 410) using the physical element addresses or other physical addresses for the physical media library. When the controller receives status information in response to the command, say LOG SENSE status information, the controller can cache the status information (step 412) and return the status information to the issuing host application (step 414).

The method of FIG. 4 can be repeated as needed or desired and can be implemented, for example, as a set of computer instructions stored on a computer readable medium (e.g., a magnetic disk, RAM, ROM, Flash Memory or other computer readable medium) that are executable by a processor. The computer instructions can be implemented in any suitable programming language according to a suitable software architecture as would be understood by those in the art.

Figure 5A:
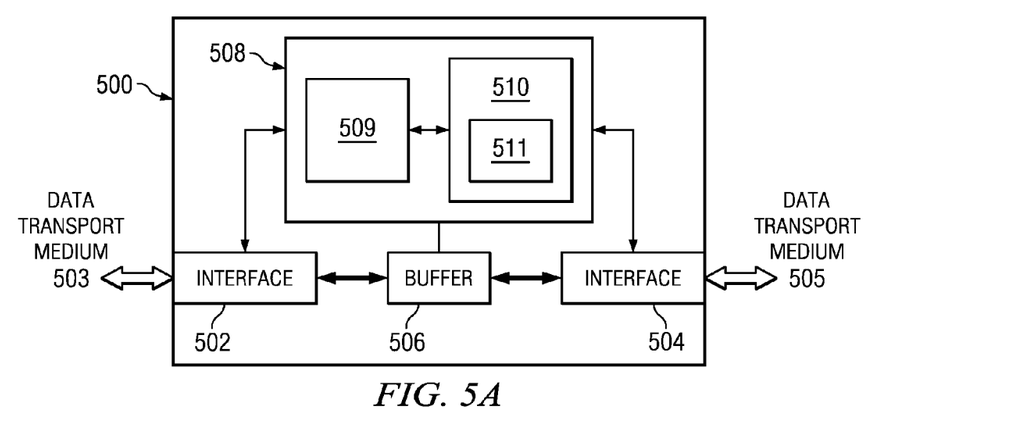
FIGS. 5A and 5B are diagrammatic representations of a controller according to one embodiment of the present invention.

FIG. 5A is a diagrammatic representation of one embodiment of a controller 500 according to the present invention. In the example of FIG. 5A, controller 500 is a storage routing device. Controller 500 can comprise a first transport medium interface 502 that interfaces with a first transport medium 503 and a second transport medium interface 504 that interfaces with a second transport medium 505. In one embodiment of the present invention, the first transport medium 503 can be a Fibre Channel transport medium, the second transport medium 505 a SCSI bus, interface 502 a Fibre Channel controller, such as a fibre channel controller based on the TACHYON family of fibre channel control chips and interface 504 a SCSI controller. TACHYON fibre channel control chips are a product Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5500x, where x is the Rev A, B, C, etc.), the DX4 (HPFC-5700x, where x is the Rev A, B, C, etc.).

In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; Fibre Channel and Fibre Advanced Technology Attachment ("FATA"); SATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols.

A buffer 506 provides memory work space and is connected to both interface 502 and to interface 504. Buffer 506 can be located remotely from routing device 500 and can also comprise multiple buffers. A processing unit 508 can be connected to interface 502, interface 504 and buffer 506. According to one embodiment of the present invention, processing unit 508 comprises one or more processors 509 for controlling operation of controller 500 and a computer readable medium 510 accessible by the processor storing a set of computer instructions 511 that are executable by the processor. The computer readable medium can include one or more of RAM, ROM, Flash memory, magnetic disk or other storage medium known in the art. According to other embodiments of the present invention buffer 506 and/or computer readable medium 511 can be onboard processor 510.

In one implementation (not shown), the controller 500 can be a rack mount or free standing device with an internal power supply. Controller 500 can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of the controller 500 can support SCSI direct and sequential access target devices and can support SCSI initiators, as well. The Fibre Channel port can interface to fibre channel enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the routing device can include software as required to control functions of the various elements, present library partitions, map between logical and physical addresses, respond to status commands, cache status information, generate commands and provide appropriate translations between the FC and SCSI data transport protocols (or other protocols if necessary for other embodiments).

Figure 5B:
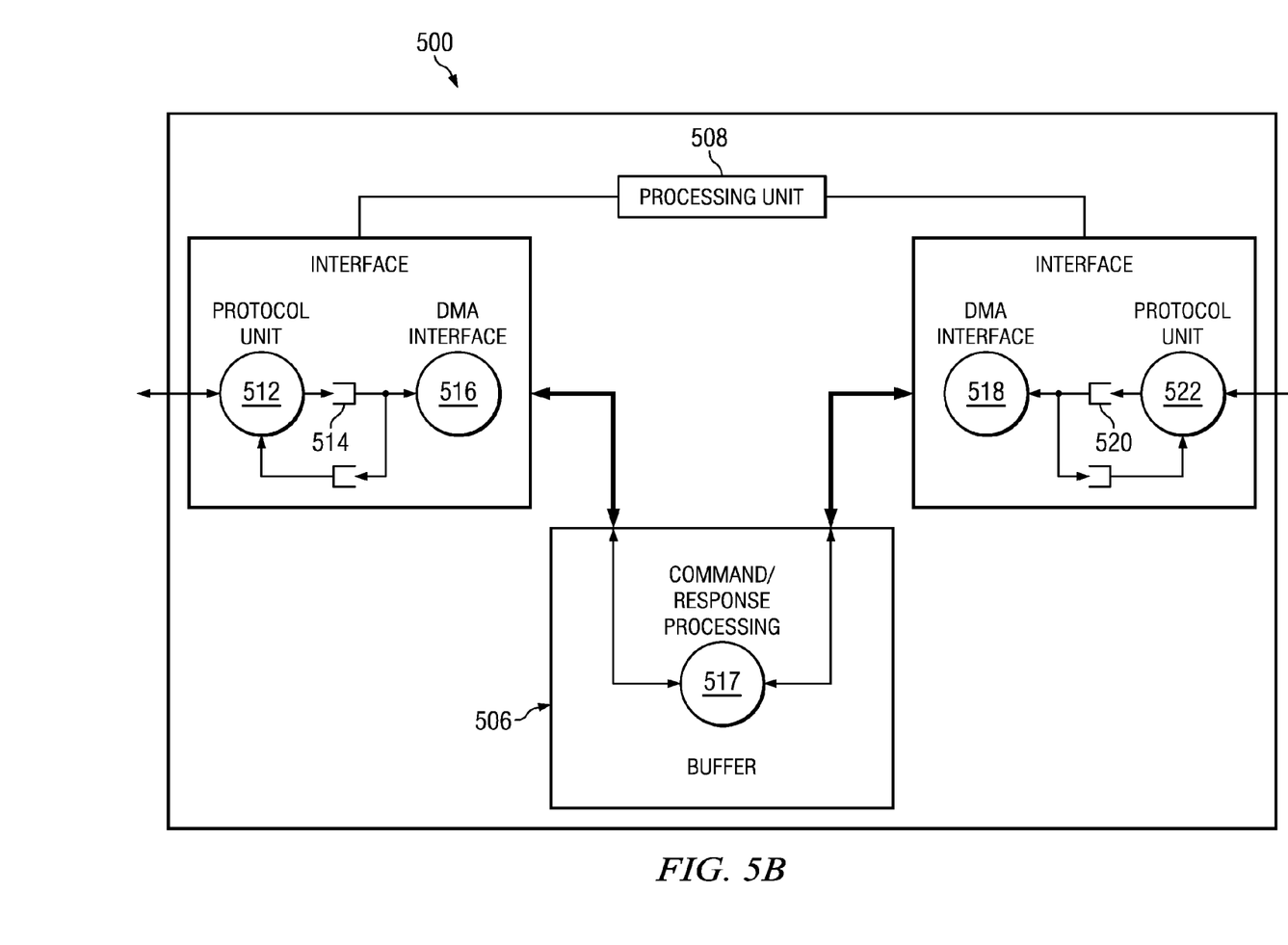

FIG. 5B is a block diagram of one embodiment of data flow within the controller 500 of FIG. 5A. As shown, data from first transport medium 503 (e.g., the Fibre Channel transport medium) is processed by a protocol unit 512 (e.g., a Fibre Channel protocol unit) and placed in a FIFO queue 514. A direct memory access (DMA) interface 516 can then take data out of FIFO queue 514 and places it in buffer 506. Buffer 506 can, itself, act as a FIFO buffer for commands direct to a media library for multiple hosts and provide a memory space to cache status information.

Processing unit 508 processes the data in buffer 506 as represented by processing 517. This processing can include mapping between physical and logical addresses for elements of media library, determining whether to service a particular status command or pass the status command to the media library, processing status commands and other processing. A DMA interface 518 then pulls data from buffer 506 and places it into a buffer 520. A second protocol unit 522 pulls data from buffer 520 and communicates the data on the second transport medium 505 (e.g., the SCSI bus). Data flow in the reverse direction, from the second data transport medium 505 to the first data transport medium 503, can be accomplished in a reverse manner.

In one embodiment, processing unit 508 can be operable to present a library partition to a host on first data transport medium 503. Additionally, processing unit 508 can be operable to determine if a received command should be forwarded to a media changer and, if so, forward the command to the media changer. If, on the other hand, the status command is not forwarded to the media changer, processing unit 508 can construct a response to the command (e.g., an EAA page) or can access cached status information and return a response to the issuing host application. Additionally, processing unit 508 can provide additional processing such as providing access controls or processing for the operation of routing device 500.

It should be noted that the example of the controller of FIGS. 5A and 5B is provided by way of example. Embodiments of the present invention can be implemented in devices such as storage routing devices or other devices. Additionally, embodiments of the present invention can be implemented has hardware and/or software programming. Embodiments can be implemented through execution of computer instructions stored on any computer readable medium known in the art (e.g., optical disk, magnetic disk, flash memory, RAM, ROM, EEPROM or other computer readable medium).

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A method for handling status commands directed to a partitioned media library comprising:
providing a storage router communicating with multiple remote hosts over a first transport media and with a media changer of a physical media library over a second transport media, wherein the storage router comprises a computer readable memory, a controller module and a processor configured to receive drive, changer and element addresses from the physical media library, partition the physical media library into smaller virtual media libraries by establishing logical drive, changer and element addresses for each virtual media library and maintaining a correspondence between the logical drive, changer and element addresses and the physical drive, changer and element addresses such that each virtual media library corresponds to a portion of the physical media library, assign the virtual media libraries to remote host applications, present each virtual media library to a remote host application to which it is assigned, and map as needed between logical drive, changer and element addresses and drive, changer and element addresses for the physical media library to forward commands from the remote host applications to the physical media library and return responses from the physical media library to the remote host applications;
receiving a plurality of status commands from issuing host applications over the first transport media at the storage router directed to logical changer addresses of the virtual media libraries;
for each status command received by the storage router, determining, by the controller module, whether the storage router should respond to the status command without passing the status command to the physical media changer, further comprising:

if the status command is a MODE SENSE command, returning an element assignment address ("EAA") page with logical element addresses for a virtual media library assigned to the issuing host; and if the status command is a LOG SENSE command, determining if the media changer of the physical media library is busy based on information cached in the computer readable memory;

if the physical media changer is busy, returning cached LOG SENSE information from cache memory to the issuing host application;

if the physical media changer is not busy, forwarding the LOG SENSE command to the physical media changer;

returning a response to the forwarded LOG SENSE command to the issuing host application.

2. The method of claim 1, wherein processing the status command at the storage router further comprises generating the element address assignment ("EAA") page at the storage router for the virtual media library assigned to the issuing host application.

3. The method of claim 1, wherein returning a response to the status command comprises determining whether information has been cached in response to a previous status command and returning a set of cached information.

4. The method of claim 1, further comprising:
wherein if it is determined that the storage router should pass the status command to the media changer:
forwarding the status command to the media changer;
receiving information from the media changer in response to the status command;
caching the information in the computer readable memory at the storage router; and
returning the information to the issuing host application, wherein information returned in the response corresponds to the library partition assigned to the issuing host application.

5. The method of claim 1, wherein the storage router is remote from the media library.

6. The method of claim 1, wherein the storage router receives status commands from issuing host applications according to an iSCSI protocol.

7. A system comprising:
a storage router communicatively coupled to a plurality of host computers and to a physical media library, the storage router comprising a computer readable memory, a controller module and a processor configured to receive drive, changer and element addresses from the physical media library, partition the physical media library into smaller virtual media libraries by establishing logical drive, changer and element addresses for each virtual media library and maintaining a correspondence between the logical drive, changer and element addresses and the physical drive, changer and element addresses such that each virtual media library corresponds to a portion of the physical media library, assign the virtual media libraries to remote host applications, present each virtual media library to a remote host application to which it is assigned, and map as needed between logical drive, changer and element addresses and drive, changer and element addresses for the physical media library to forward commands from the remote host applications to the physical media library and return responses from the physical media library to the remote host applications; and
a computer program product stored on the computer readable memory and comprising instructions capable of instructing the storage router to manage status commands directed to the partitioned media library, wherein the computer product comprises a set of computer instructions executable by the controller module to:
receive a plurality of status commands directed to logical changer addresses of the virtual media library over a transport media from a plurality of host applications on multiple remote hosts;
determine whether to respond a status command directed to the media changer from an issuing host application without passing the status command to the media changer, wherein determining whether the storage router should respond comprises:
if the status command is a MODE SENSE command, returning an element assignment address ("EAA") page with logical element addresses for a virtual media library assigned to the issuing host application; and
returning an element assignment address ("EAA") page with logical element addresses for a virtual media library assigned to the issuing host application; and
if the status command is a LOG SENSE command, determining if the media changer of the physical media library is busy based on information cached in the computer readable memory;
if the physical media changer is busy, returning cached LOG SENSE information from cache memory to the issuing host application;
if the physical media changer is not busy, forwarding the LOG SENSE command to the physical media changer;
returning a response to the forwarded LOG SENSE command to the issuing host application.

8. The system of claim 7, wherein the set of computer instructions comprise instructions executable to process the status command by:
generating the element address assignment ("EAA") for the virtual media library assigned to the issuing host application; and
returning the EAA page in the response to the status command.

9. The system of claim 7, wherein the set of computer instructions to return the response to the status command further comprise instructions executable to determine whether status information has been cached in response to a previous status command and return a set of cached status information in response to the command.

10. The system of claim 7, wherein the set of computer instructions further comprise instructions executable to:
if it is determined that the command should be passed to the media changer:
forward the status command to the media changer;
cache information received from the media changer in the computer readable memory; and
return the information to the issuing host application.

11. The system of claim 7, wherein the storage router receives status commands from issuing host applications according to an iSCSI protocol.

12. A system comprising:
a plurality of hosts;
a physical media library having a media changer, one or more drives and a set of elements;
a storage router communicatively coupled to the plurality of hosts over a first transport medium and the media changer of the physical media library over a second transport medium, wherein the storage router; is operable to:

receive drive, changer and element addresses from the physical media library; partition the physical media library into smaller virtual media libraries by establishing logical drive, changer and element addresses for each virtual media library and maintaining a correspondence between the logical drive, changer and element addresses and the physical drive, changer and element addresses such that each virtual media library corresponds to a portion of the physical media library;

assign the virtual media libraries to remote host applications;

present each virtual media library to remote host applications to which it is assigned;

map as needed between logical drive, changer and element addresses and drive, changer and element addresses for the physical media library to forward commands from the remote host applications to the physical media library and return responses from the physical media library to the remote host applications;

receive a MODE SENSE command from an issuing host application directed to a logical addresses of a virtual media library assigned to that issuing host application and return an element address assignment ("EAA") page indicating logical element addresses for the virtual media library assigned to the issuing host application;

receiving an INQUIRY command from the issuing host application; and determining if the media changer of the physical media library is busy based on information cached in the computer readable memory;

if the media changer of the physical media library is busy, then returning cached INQUIRY data to the issuing host application; and if the media changer of the physical media library is not busy, forwarding the INQUIRY command to the media changer of the physical media library, receiving a response to the INQUIRY command from the media changer of the physical media library and returning the response to the forwarded INQUIRY command to the issuing host application.

13. The system of claim 12, wherein the EAA page comprises a base logical address and a number of elements for each element type of the physical media library.

14. A storage controller comprising:

an first interface to connect to a first transport medium;

a second interface to connect to a second transport medium;

a computer readable memory;

a processing unit coupled to the first interface and the second interface and the computer readable memory, the processing unit operable to:

to partition a physical media library connected to the second transport medium into smaller virtual media libraries by establishing logical drive, changer and element addresses for each virtual media library and maintaining a correspondence between the logical drive, changer and element addresses and physical drive, changer and element addresses for the physical media library such that each virtual media library corresponds to a portion of the physical media library, assign the virtual media libraries to remote host applications on remote hosts connected to the first transport medium, present each virtual media library to a remote host application to which it is assigned, and translate logical drive, changer and element addresses into drive, changer and element addresses for the physical media library to forward commands from the remote host applications to the physical media library and return responses from the physical media library to the remote host applications;

maintain a cache of status information in the computer readable memory;

process status commands directed to logical changer addresses of the virtual media libraries and received from issuing host applications;

if the status command is a MODE SENSE command, generate an element assignment address ("EAA") page with logical element addresses for a virtual media library assigned to the issuing host application and return the EAA page to the issuing host application; and if the status command is a LOG SENSE command, determining if the media changer of the physical media library is busy based on information cached in the computer readable memory;

if the physical media changer is busy, returning cached LOG SENSE information from cache memory to the issuing host application;

if the physical media changer is not busy, forwarding the LOG SENSE command to the physical media changer;

return a response to the forwarded LOG SENSE command to the issuing host application.

15. The storage controller of claim 14, wherein the processing unit is further operable to:

receive an additional status command from an issuing host application;

determine that the storage controller should pass the status command to the media changer of the physical media library:

forward the status command to the media changer;

receive information from the media changer of the physical media library in response to the status command;

cache the information in the computer readable memory; and return the information to the issuing host application.

16. The storage controller of claim 14, wherein the storage controller is operable to receive commands according to an iSCSI protocol from the remote hosts.

17. The storage controller of claim 16, wherein the storage controller is operable to connect to at least one of SAS, SATA or SCSI drives of the physical media library.

* * * * *